No. 669,965. Patented Mar. 12, 1901.
S. S. JAMISON.
NUT LOCK.
(Application filed Oct. 9, 1900.)
(No Model.)

WITNESSES:
Jos. A. Ryan
Edw. W. Byrn.

INVENTOR
S. S. Jamison.
BY Munn & Co.
ATTORNEYS

UNITED STATES PATENT OFFICE.

SAMUEL STEWART JAMISON, OF SALTSBURG, PENNSYLVANIA.

NUT-LOCK.

SPECIFICATION forming part of Letters Patent No. 669,965, dated March 12, 1901.

Application filed October 9, 1900. Serial No. 32,473. (No model.)

*To all whom it may concern:*

Be it known that I, SAMUEL STEWART JAMISON, of Saltsburg, in the county of Indiana and State of Pennsylvania, have invented a new and useful Improvement in Nut-Locks, of which the following is a specification.

The object of my invention is to provide an improved form of bolt and nut which shall be cheap, strong, quickly applied, and when once applied will be locked for all time until it is desired to remove it, so that there is no such thing as accidental loosening and dislodgment of the nut. For many reasons the ordinary screw-bolt and nut are not satisfactory. The nut is liable to loosen and come off, the threads are liable to strip and to rust, and considerable time is required to turn on and off the nuts. An effort to overcome some of these difficulties has been made by making the nut and bolt without threads and making the bolt with a hollow end and upsetting or expanding the bolt end in the nut by a rivet connection. My invention follows this general method; and it consists in the special construction and arrangement of the nut, as will be hereinafter fully described, with reference to the drawings, in which—

Figure 1:
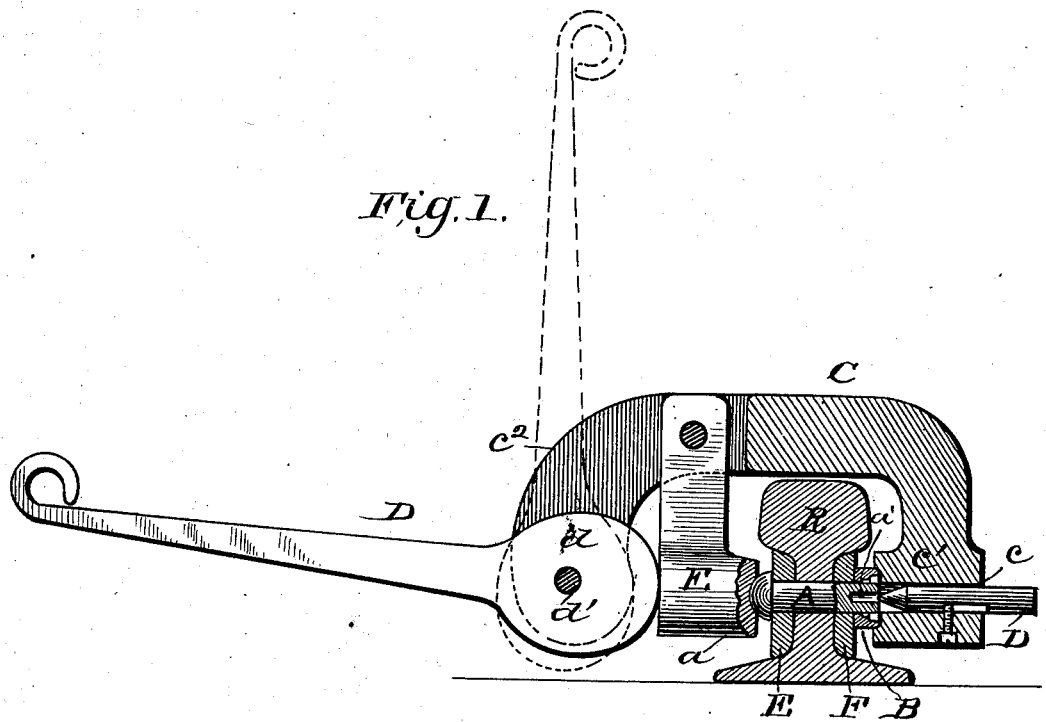
Figure 2:
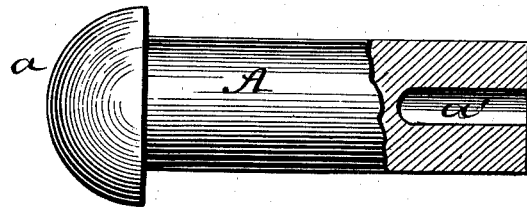
Figures 3, 6:
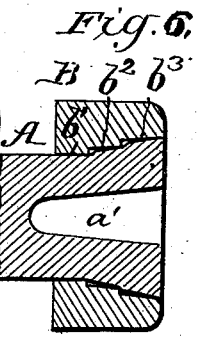
Figure 4:
Figure 5:
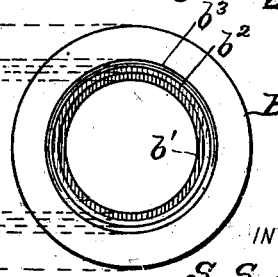

Figure 1 is a partly sectional and partly side view of the nut-lock, the rail, and the setting devices. Fig. 2 is a side view, partly in section, of the bolt; Fig. 3, an end view of the same; Fig. 4, a section through the nut; Fig. 5, a face view of the nut; and Fig. 6, a sectional view of the upset end of the bolt in the nut, forming a permanent and tight lock.

A is the bolt, which may be of any shape in cross-section, but is at its end opposite the head $a$ bored out or forged with a central hole $a'$.

B is the nut, which may be round, square, or other external shape and has a round or other-shaped hole closely fitting the bolt at one side $b'$ and gradually increasing in diameter toward the other face by a succession of independent and disconnected steps $b^2$ $b^3$, which have between them sharp detent edges extending all around. This stepped construction of the tapered hole has a very important function, as will be described farther along. After the bolt is put in place through the fish-plate of the rail or other parts to be held together the nut is slipped on, with the smaller orifice next to the fish-plate, and a tapered tool is then inserted in the central cavity $a'$ of the bolt, and a blow from a sledge-hammer on said tool is made to expand the end of the bolt to a divergent end that fills the larger opening in the outer side of the nut. Now if said nut has only a straight smooth taper, as heretofore, it will not be possible to expand the bolt end to such a tight fit as to perfectly fill the straight tapered hole on account of the elasticity or spring of the metal, and the result would be that the nut is not held tightly against its bearing, and being loose it rattes and is also defective in holding power; but when the nut is made with a series of steps $b'$ $b^2$ $b^3$ the metal of the bolt is spread into these steps, and each shoulder between the steps forms a sort of detent that is tightly and closely buried into the metal of the bolt, so that the bolt and nut are held tightly together in the same position in which they are riveted together. Another distinction is that when a bolt end is expanded in a straight tapered hole of a nut after the upset end of the bolt comes to a flat bearing against the tapered hole any further upsetting action tends to burst the nut. With my construction of nut this does not take place, as the angular edges between the steps bury into the bolt end and allow the metal of the latter to spread into the angular recesses between the angular projections.

This bolt, it will be seen, is very much cheaper than a screw-bolt, as there are no threads to be cut, takes little or no time to apply it, and when once set is firmly locked without any possibility of ever coming off. To quickly apply the same, I have devised a special machine consisting of a strong C-shaped metal frame C, having one end $c^2$ forked and in the slot of the fork a pivoted or swinging anvil-piece E and behind it a lever D, fulcrumed on a pin $d'$ in the fork and having a cam-head $d$, which is adapted to bear against the back of the swinging anvil E. The other end $c'$ of the C-shaped frame has a perforation $c$ in line with the anvil-head and adapted to retain a tapered expanding-tool D, which is thus brought in line with the hole $a'$ in the bolt. The end $c'$ of the frame C is made to bear against the nut B, and when the lever D is turned down this end $c'$ on one side and the anvil E on the other are made to clamp and hold the bolt, nut, fish-plate, and rails together to a tightly-closed position while being riveted. A stroke of a hammer then delivered upon the end of the tool D serves to upset the end of the bolt in the nut and to tightly connect these parts together without loosening up after the setting-tool is removed.

Both the head of the anvil E and the rigid head $c'$ are countersunk, so as to support the nut and bolt-head and keep the tool in place during its application. The tool D is designed to be loosely retained in the head $c'$ by means of a slot and set-screw, as shown.

Having thus described my invention, what I claim as new, and desire to secure by Letters Patent, is—

1. As a new article of manufacture, a nut having a generally-tapered hole through it provided with a series of independent angular projections in its inner face substantially as described.

2. A nut having a generally-tapered hole through it provided with a series of independent angular projections running all around the inner face of said hole substantially as described.

3. The combination with a bolt having a hole in its end; of a nut having a tapered hole through it provided on its inner face with a series of independent angular projections on it substantially as described.

SAMUEL STEWART JAMISON.

Witnesses:
JOE A. McCLARAN,
J. F. PIPER.